United States Patent
Wu et al.

(10) Patent No.: US 8,232,975 B2
(45) Date of Patent: Jul. 31, 2012

(54) TOUCH PANEL

(75) Inventors: Hsien-Hsin Wu, Taichung (TW); Yueh-Chi Fan, Taichung County (TW); Chiung-Chuang Chen, Changhua County (TW); Ruey-Shing Weng, Kaohsiung (TW)

(73) Assignee: Wintek Corporation, Taichung (TW)

( * ) Notice: Subject to any disclaimer, the term of this patent is extended or adjusted under 35 U.S.C. 154(b) by 461 days.

(21) Appl. No.: 12/617,730

(22) Filed: Nov. 13, 2009

(65) Prior Publication Data

US 2010/0123674 A1    May 20, 2010

(30) Foreign Application Priority Data

Nov. 14, 2008  (TW) ................................ 97144158 A

(51) Int. Cl.
*G06F 3/041* (2006.01)
(52) U.S. Cl. ........................ 345/173; 345/174; 178/18.05
(58) Field of Classification Search .................. 345/173, 345/174; 178/18.01, 18.03, 18.05, 18.06
See application file for complete search history.

(56) References Cited

U.S. PATENT DOCUMENTS

| 2005/0030048 | A1* | 2/2005 | Bolender et al. | 324/661 |
|---|---|---|---|---|
| 2008/0264699 | A1* | 10/2008 | Chang et al. | 178/18.01 |
| 2008/0309635 | A1* | 12/2008 | Matsuo | 345/173 |
| 2010/0073320 | A1* | 3/2010 | Liao et al. | 345/174 |

FOREIGN PATENT DOCUMENTS

TW           200723310           6/2007

* cited by examiner

*Primary Examiner* — Adam R Giesy
(74) *Attorney, Agent, or Firm* — Jianq Chyun, IP Office

(57) ABSTRACT

A touch panel including at least a first sensing string and at least a second sensing string is provided. The first sensing string arranged in a first direction includes first sensing pads electrically connecting with each other and at least a first connecting pattern. The first connecting patterns are located between two adjacent first sensing pads. The second sensing string does not contact the first sensing string and is arranged in a second direction which crosses with the first direction. The second sensing string includes second sensing pads and at least a second connecting pattern. The second sensing pads electrically connected with one another are located among the first sensing pads. The second connecting pattern is located between two adjacent second sensing pads. Resistivities of the first connecting pattern and the second connecting pattern are lower than those of the first sensing pad and the second sensing pad respectively.

13 Claims, 4 Drawing Sheets

TOUCH PANEL

CROSS-REFERENCE TO RELATED APPLICATION

This application claims the priority benefit of Taiwan application serial No. 97144158, filed on Nov. 14, 2008. The entirety of the above-mentioned patent application is hereby incorporated by reference herein and made a part of this specification.

BACKGROUND OF THE INVENTION

1. Field of the Invention

The present invention is related to a touch panel, and particularly to a touch panel with higher sensing sensibility.

2. Description of Related Art

FIG. 1 shows a conventional touch panel. To clearly illustrate the device design of the conventional touch panel, FIG. 1 only shows a portion of an enlarged sensing string and omits other possibly present film layers or devices. As shown in FIG. 1, a conventional touch panel 100 includes a plurality of first sensing string 120 and a plurality of second sensing string 140. More specifically, the first sensing string 120 extends in a first direction. Each of the first sensing string 120 is formed by serially connecting a plurality of first sensing pads 122 with a first bridge line 124. The second sensing string 140 extends in a second direction. Each of the second sensing string 140 is formed by serially connecting a plurality of second sensing pads 142 with a second bridge line 144. The first sensing pads 122 and the second sensing pads 142 can constitute a sensing array to achieve surface sensing.

When a user touches the touch panel 100 with a finger, the first sensing string 120 and the second sensing string 140 of the touch panel 100 would cause variation in capacitance on a position where the finger touches. Afterwards, the variation in capacitance is converted into a control signal to be transmitted to a control circuit board and calculated to obtain a result. Thereafter, a proper instruction according to the result is outputted to operate an electronic device. However, an area where the first bridge line 124 and the second bridge line 144 are intersected has a greater parasitic capacitance. In comparison with the parasitic capacitance, the variation in capacitance caused by the user touching the touch panel 100 is probably not sufficiently significant and thus is disadvantageous to calculation of a control circuit.

Generally, a line width of the first bridge line 124 or the second bridge line 144 is about 40 μm-70 μm. In order to reduce the parasitic capacitance, the line widths of the first bridge line 124 and the second bridge line 144 can be reduced in the intersection area of the first bridge line 124 and the second bridge line 144. Nevertheless, the first sensing pads 122, the second sensing pads 142, the first bridge line 124, and the second bridge line 144 are all fabricated by transparent conductive materials. If the line widths of the first bridge line 124 and the second bridge line 144 are reduced, the impedance of the bridge line will increase, which in turn is disadvantageous to touch sensing signal transmission.

SUMMARY OF THE INVENTION

The present invention provides a touch panel to solve the issue of large parasitic capacitance present in designs of the conventional touch panel.

The present invention provides a touch panel including at least one first sensing string and at least one second sensing string. The first sensing string is arranged in a first direction and includes a plurality of first sensing pads and at least one first connecting pattern. The first sensing pads are electrically connected with one another by the first connecting pattern. That is, the first connecting pattern is located between two adjacent first sensing pads for connecting the first sensing pads. A resistivity of the first connecting pattern is lower than a resistivity of the first sensing pad. The second sensing string does not contact the first sensing string and is arranged in a second direction. The first direction is intersected with the second direction. The second sensing string includes a plurality of second sensing pads and at least one second connecting pattern. The second sensing pads are located among the first sensing pads. The second sensing pads are electrically connected with one another. The second connecting pattern is located between two adjacent second sensing pads. A resistivity of the second connecting pattern is lower than a resistivity of the second sensing pad.

According to an embodiment of the present invention, a line width of the first connecting pattern or the second connecting pattern is substantially larger than or equal to 1 μm and smaller than or equal to 30 μm. In practice, the line widths of the first connecting pattern and the second connecting pattern can also be larger than or equal to 10 μm and smaller than or equal to 20 μm.

According to an embodiment of the present invention, the first/second sensing string further includes at least one first/second auxiliary pattern connected between the first/second sensing pads, and the first/second connecting pattern is directly disposed on the first/second auxiliary pattern. The line width of the first auxiliary pattern is smaller than or equal to the line width of the first connecting pattern in an area where the first connecting pattern is located. In practice, the line width of the first auxiliary pattern in the area where the first connecting pattern is located is different from the line width of the first auxiliary pattern outside the area where the first connecting pattern is located. Furthermore, a material of the first auxiliary pattern can be the same as the material of the first sensing pads. Likewise, the line width of the second auxiliary pattern is smaller than or equal to the line width of the second connecting pattern in an area where the second connecting pattern is located. The line width of the second auxiliary pattern in the area where the second connecting pattern is located can be different from the line width of the second auxiliary pattern outside the area where the second connecting pattern is located. The material of the second auxiliary pattern is the same as the material of the second sensing pads, for example.

According to an embodiment of the present invention, the material of the first/second sensing pads is a transparent conductive material and the material of the first/second connecting pattern includes Ag, Al, Mo, Ti, Tn, Cu, Au, W, Cr or an alloy of the foregoing materials.

In the present invention, the connecting patterns with lower resistivity are disposed in the sensing strings, and therefore the line width of the connecting patterns in the intersection region can be properly reduced. In other words, the parasitic capacitance between the first connecting pattern and the second connecting pattern in the touch panel of the present invention is smaller than that in the prior art. Accordingly, the touch panel of the present invention has satisfactory touch sensitivity. In addition, as the resistivity of the connecting pattern in the present invention is lower, when the line width of the connecting patterns is reduced, the signal transmission of the touch panel is not adversely affected.

To make the above and other objectives, features, and advantages of the present invention more comprehensible, several embodiments accompanied with figures are detailed as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
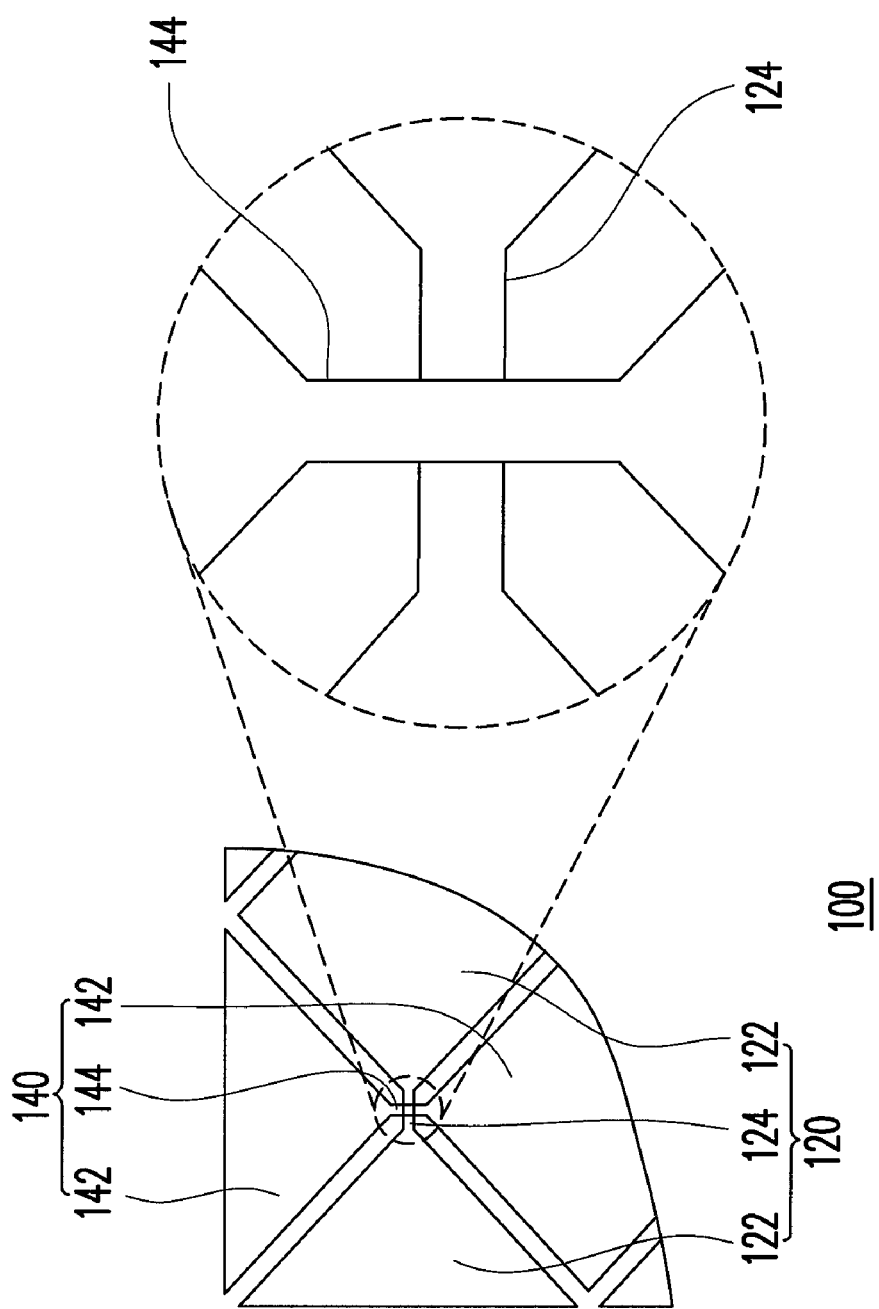
FIG. 1 is a schematic view of a conventional touch panel.
Figure 2:
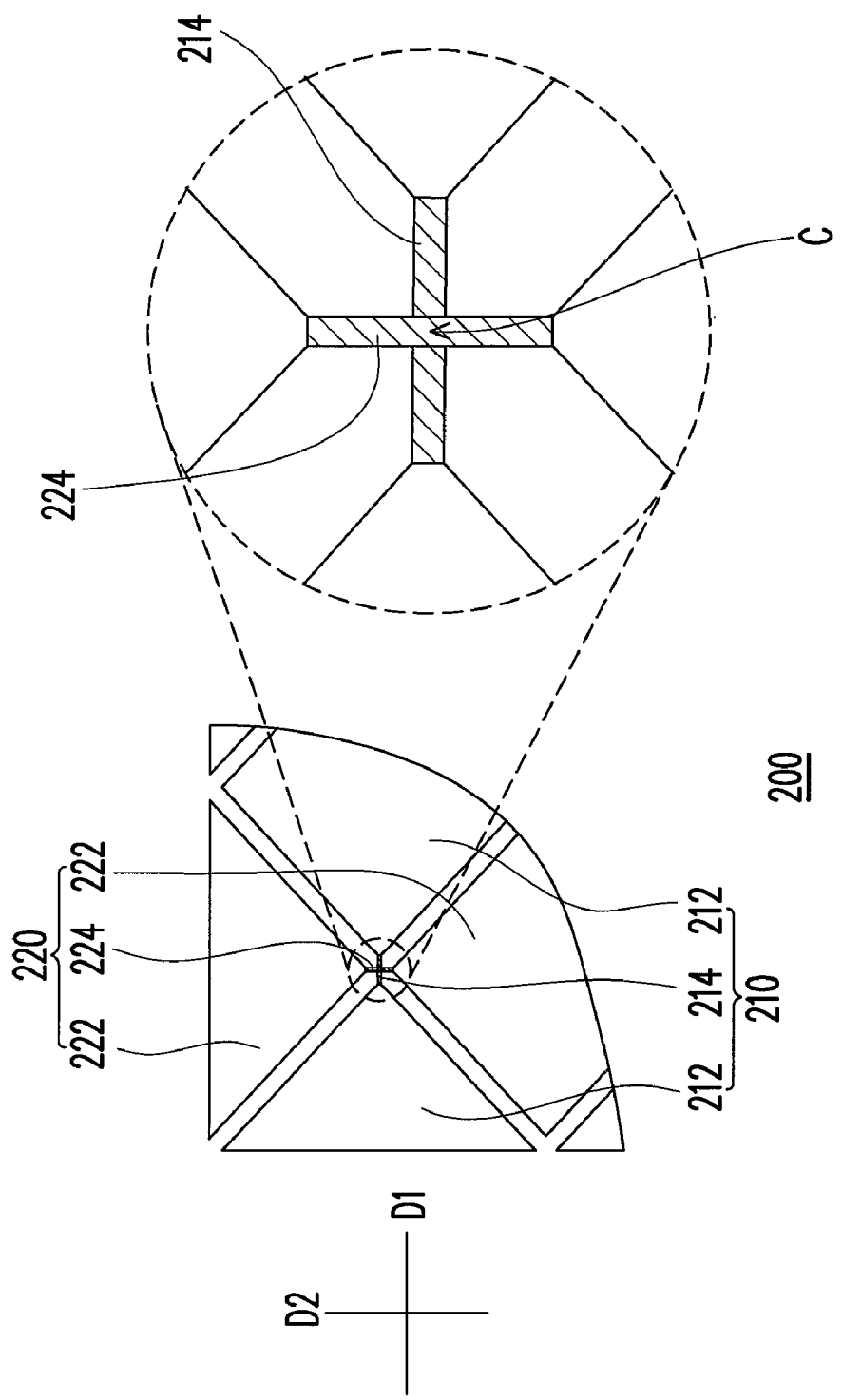
FIG. 2 is a schematic view of a touch panel according to the first embodiment of the present invention.

FIG. 2 shows a touch panel according to the first embodiment of the present invention. Referring to FIG. 2, a touch panel 200 has at least one first sensing string 210 and at least one second sensing string 220. The first sensing string 210 is arranged in a first direction D1. The second sensing string 220 does not contact the first sensing string 210 and is arranged in a second direction D2. The first direction D1 is intersected with the second direction D2. In practice, the first direction D1 and the second direction D2 can be perpendicular to each other, or they can be intersected at an angle other than 90 degrees or 0 degree. According to the present embodiment, the first direction D1 and the second direction D2 are perpendicular to each other, for example.

The first sensing string 210 includes a plurality of first sensing pads 212 and at least one first connecting pattern 214. The first sensing pads 212 are electrically connected with one another. The first connecting pattern 214 is located between two adjacent first sensing pads 212. A resistivity of the first connecting pattern 214 is lower than a resistivity of the first sensing pads 212. The second sensing string 220 also includes a plurality of second sensing pads 222 and at least one second connecting pattern 224. The second sensing pads 222 are located between the first sensing pads 212 and are electrically connected with one another. The second connecting pattern 224 is located between two adjacent second sensing pads 222. A resistivity of the second connecting pattern 224 is lower than a resistivity of the second sensing pads 222.

Specifically, a sensing array constituted by the first sensing pads 212 and the second sensing pads 222. Furthermore, the first connecting pattern 214, for example, does not contact the second connecting pattern 224, and the first connecting pattern 214 can be located under the second connecting pattern 224 with an insulator therebetween (not shown). Further, the first sensing pads 212 and the second sensing pads 222 may be not disposed on the same plane, but the present invention is not limited to this arrangement. In other words, the first sensing pads 212 and the second sensing pads 222 may be formed as the same layer or as different layers respectively.

In fact, the first sensing pads 212 and the second sensing pads 222 are fabricated with transparent conductive materials. If the touch panel 200 is combined with a display panel (not shown), the touch panel 200 provides fine light transmittance. However, as transparency and impedance of a transparent conductive material are inversely proportional, considering the light transmittance and the transmission impedance, the line width of the bridge lines of the conventional touch panel must be maintained at a certain width, thus failing to reduce the parasitic capacitance.

In order to reduce the parasitic capacitance in an intersection region C of the first connecting pattern 214 and the second connecting pattern 224 and further maintain proper transmission impedance, a material with low resistivity is used to manufacture the first connecting pattern 214 and the second connecting pattern 224 in the present embodiment. Accordingly, the line widths of the first connecting pattern 214 and the second connecting pattern 224 are reduced to lower the parasitic capacitance without causing large transmission impedance at the same time. For example, a material used for fabricating the first connecting pattern 214 and the second connecting pattern 224 is, for example, Ag, Al, Mo, Ti, Tn, Cu, Au, W, Cr or an alloy of the foregoing materials. The resistivity of any of the foregoing materials is lower than the resistivity of an oxide conductive material. Therefore, the line widths of the first connecting pattern 214 and the second connecting pattern 224 can be properly reduced to lower the parasitic capacitance without affecting signal transmission quality of the touch panel 200.

According to the present embodiment, the line widths of the first connecting pattern 214 and the second connecting pattern 224 are substantially larger than or equal to 1 μm and smaller than or equal to 30 μm. According to other embodiments, the line widths of the first connecting pattern 214 and the second connecting pattern 224 can also be substantially larger than or equal to 1 μm and smaller than or equal to 20 μm. If the first connecting pattern 214 and the second connecting pattern 224 perpendicular to each other are taken for example, conventional bridge lines have line widths ranged between 40 μm-70 μm, and an intersection region formed by the connecting patterns must be larger than the intersection region C of the present embodiment. Therefore, the parasitic capacitance of the intersection region C in the touch panel 200 of the present invention is apparently smaller than the parasitic capacitance of the conventional structure. An induced capacitance generated by a user touching the touch panel 200 is easily distinguished from the parasitic capacitance of the intersection region C, which in turn is conducive to increasing sensitivity of the touch panel 200.

In addition, the first connecting pattern 214 and the second connecting pattern 224 are fabricated by metallic materials. The resistivity of a transparent conductive material may be several times of the resistivity of the first connecting pattern 214 and the second connecting pattern 224. Hence, the increase in impedance caused by reduction of the line widths of the first connecting pattern 214 and the second connecting pattern 224 are still maintained within an acceptable range so as to fulfill the requirement on transmission quality of a touch panel 300.

In detail, the impedance of a conductive line is inversely proportional to a cross-sectional area of the conductive line and proportional to the resistivity of the material. Suppose the resistivity of a certain metallic material is one-third of the resistivity of the transparent conductive material. In a design of the same line thickness, to achieve the same transmission impedance, the line width of the metallic material can be reduced as one-third of the line width of the transparent conductive material. In other words, when the first and second connecting patterns 214 and 224 are fabricated with a low-resistivity material, reduction of the line widths of the connecting patterns 214 and 224 does not easily result in a transmission impedance higher than that in the conventional design. In fact, when properly designed, the connecting patterns 214 and 224 with smaller line widths provide a lower transmission impedance instead.

The metallic materials have inferior light transmittance, but in the present embodiment the first connecting pattern 214 and the second connecting pattern 224 have smaller line widths, which human eyes cannot easily perceive. Hence, the first connecting pattern 214 and the second connecting pattern 224 of the present embodiment do not substantially affect optical properties of the touch panel 300. Overall, in the present invention, the first connecting pattern 214 and the second connecting pattern 224 are disposed to effectively lower the parasitic capacitance such that the touch panel 300 maintains its satisfactory signal transmission quality and optical properties.

Figure 3:
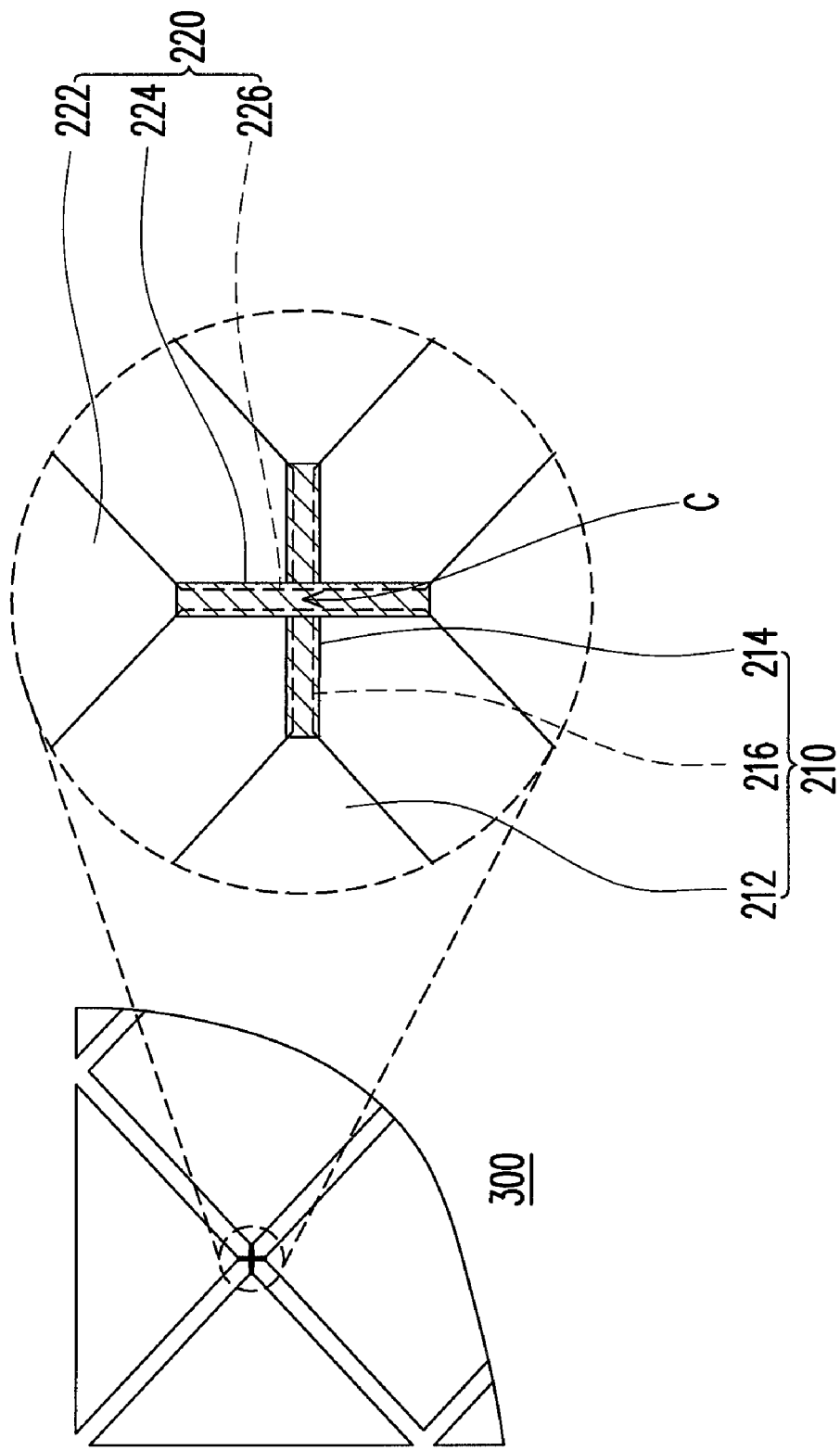
FIG. 3 is a schematic view of a touch panel according to the second embodiment of the present invention.

FIG. 3 shows a touch panel according to the second embodiment of the present invention. Referring to FIG. 3, the touch panel 300 is generally the same as the touch panel 200. The first sensing string 210 of the touch panel 300 further includes at least one first auxiliary pattern 216, and the second sensing string 220 further includes at least one second auxiliary pattern 226. The first auxiliary pattern 216 is connected between the first sensing pads 212, and the second auxiliary pattern 226 is connected between the second sensing pads 222.

In steps of a relevant process of the touch panel 200 or the touch panel 300, the sensing strings 210 and 220 are formed on a substrate (not shown). Herein, adhesion of the low-resistivity metallic materials to the substrate (not shown) is not quite satisfactory. Therefore, in the present embodiment, the first connecting pattern 214 is directly disposed on the first auxiliary pattern 216, and the second connecting pattern 224 is directly disposed on the second auxiliary pattern 226. Through the disposition of the first auxiliary pattern 216 and the second auxiliary pattern 226, the adhesion of the first connecting pattern 214 and the second connecting pattern 224 to the substrate (not shown) is enhanced. In other words, according to the present embodiment, the first auxiliary pattern 216 and the second auxiliary pattern 226 are disposed to improve process yield and reliability of the touch panel 300.

Compared to the material of the substrate (not shown), the metallic materials have better adhesion to transparent conductive substances. Hence, the materials of the first auxiliary pattern 216 and the first sensing pads 212 can be the same, and the material of the second auxiliary pattern 226, for example, can also be the same as that of the second sensing pads 222. In practice, the first auxiliary pattern 216 and the second auxiliary pattern 226 can be simultaneously fabricated as the sensing pads 212 and 222 respectively. In other words, a fabricating method of the touch panel 300 can include first forming strings constituted by the sensing pads 212 and 222 and the auxiliary patterns 216 and 226 on the substrate and then forming the connecting patterns 214 and 224 on the auxiliary patterns 216 and 226.

The strings constituted by the sensing pads 212 and 222 and the auxiliary patterns 216 and 226 are similar to the sensing strings of the conventional touch panel. Therefore, when the line widths of the auxiliary patterns 216 and 226 are too large, the sensing sensibility of the touch panel 300 is affected. Accordingly, in the intersection region C of the first connecting pattern 214 and the second connecting pattern 224, the line width of the first auxiliary pattern 216 is preferably smaller than or equal to that of the first connecting pattern 214. Likewise, in the intersection region C of the first connecting pattern 214 and the second connecting pattern 224, the line width of the second auxiliary pattern 226 is smaller than or equal to that of the second connecting pattern 224, for example. Thus, the first auxiliary pattern 216 and the second auxiliary pattern 226 enhance the adhesion of the first connecting pattern 214 and the second connecting pattern 224, but do not cause adverse effect on the touch panel 300 such as increased parasitic capacitance.

In other embodiments, a method of enhancing the adhesion of the connecting patterns 214 and 224 to the substrate is not limited to this. For example, before forming the sensing strings 210 and 220 of the present invention, an auxiliary layer can be formed on the substrate (not shown) first, or a special treatment can be performed on a surface of the substrate (not shown) such that the adhesion of the metallic materials to the substrate (not shown) is enhanced.

Figure 4:
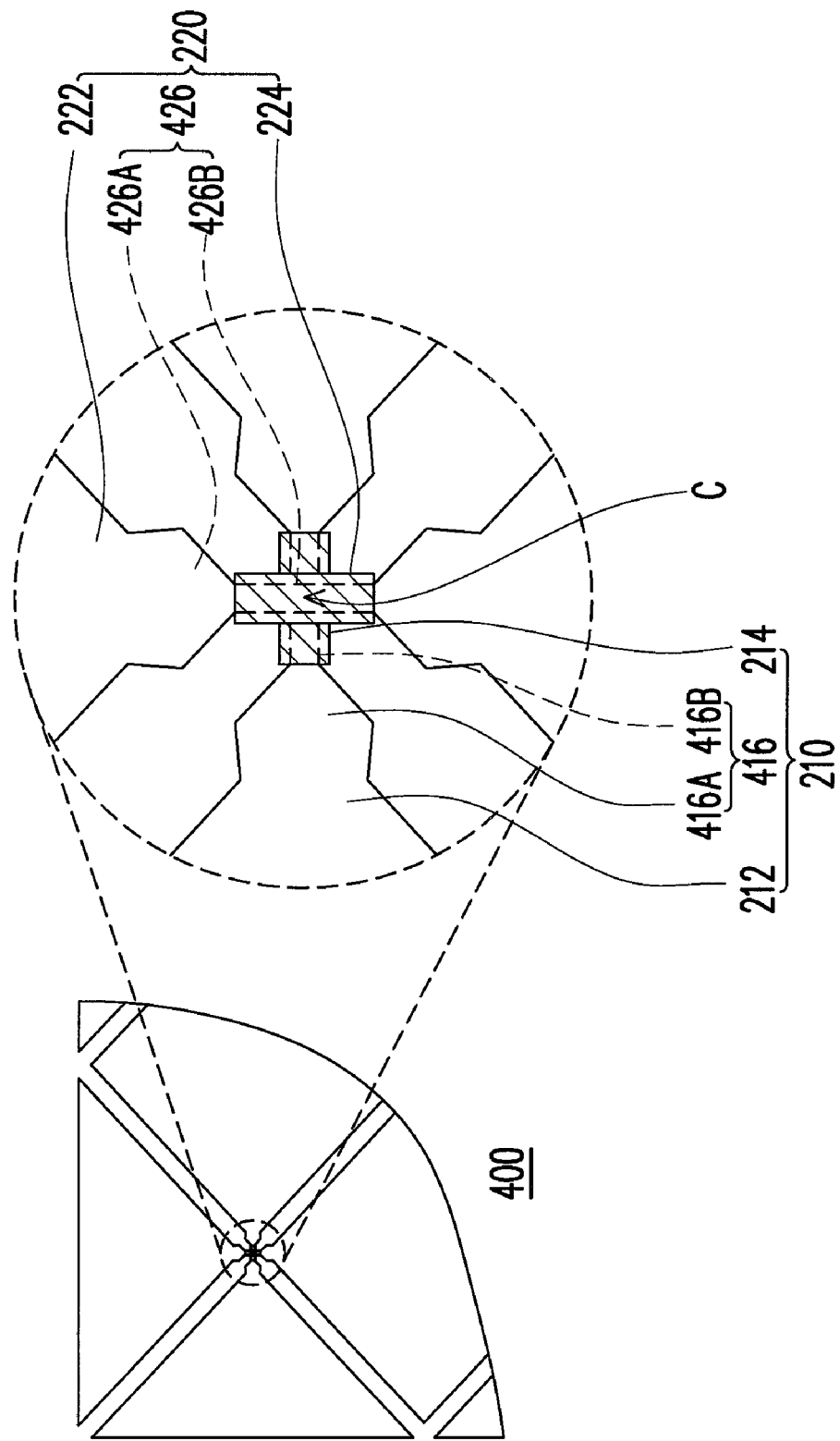
FIG. 4 is a schematic view of a touch panel according to the third embodiment of the present invention.

FIG. 4 shows a touch panel according to the third embodiment of the present invention. Referring to FIG. 4, a touch panel 400 is substantially derived from the design of the touch panel 300. In the touch panel 400, a first auxiliary pattern 416 is divided into a first section 416A and a second section 416B. A second auxiliary pattern 426 is also divided into a first section 426A and a second section 426B. The line widths of the first sections 416A and 426A are larger than those of the second sections 416B and 426B. In substance, the first sections 416A and 426A are respectively located outside a region where the first connecting pattern 214 and the second connecting pattern 224 are located. The second sections 416B and 426B are respectively located within the region where the first connecting pattern 214 and the second connecting pattern 224 are located.

The line widths of the second sections 416B and 426B are actually smaller than or equal to those of the first connecting pattern 214 and the second connecting pattern 224. In other words, the line widths of the auxiliary patterns 416 and 426 are changed correspondingly according to the connecting patterns 212 and 222, for example. The design of the present embodiment is to reduce an area of conductive devices around the intersection region C so as to lower the parasitic capacitance generated in the touch panel 400. Outside the intersection region C, the first sections 416A and 426A still maintain larger line widths. Particularly, when the materials of the first sections 416A and 426A are transparent conductive materials, a proper line width can lower transmission impedance. Furthermore, since the connecting patterns 214 and 224 fabricated with metallic materials are only disposed around the intersection region C, the connecting patterns 214 and 224 do not affect light transmittance of the touch panel 400. In other words, when the touch panel 400 is combined with a display panel, display quality of the display panel is not adversely affected by the touch panel 400.

In summary, the touch panel of the present invention uses low-resistivity materials to fabricate connecting patterns, and the connecting patterns are disposed around the intersection region of the sensing strings. Hence, in the design of the same transmission impedance, the connecting patterns have smaller line widths. Thus, in the touch panel of the present invention, the parasitic capacitance of the intersection region of the sensing strings is effectively reduced, which is conducive to improving the sensing sensitivity of the touch panel. Additionally, as the line widths of the connecting patterns are smaller, when the connecting patterns are fabricated with metallic materials, the optical properties of the touch panel are not adversely affected. Consequently, the touch panel of the present invention maintains superior optical properties.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A touch panel comprising:
    at least one sensing string, arranged in a first direction, the first sensing string comprising:
        a plurality of first sensing pads, the plurality of first sensing pads being electrically connected with one another;
        at least one first connecting pattern, located between two adjacent first sensing pads, wherein a resistivity of the first connecting pattern is lower than a resistivity of the first sensing pads;
    at least one second sensing string, not contacting the first sensing string and arranged in a second direction, wherein the first direction and the second direction are intersected, and the second sensing string comprises:
        a plurality of second sensing pads, the plurality of second sensing pads being located among the plurality of first sensing pads and electrically connected with one another; and
        at least one second connecting pattern, located between two adjacent second sensing pads, wherein a resistivity of the second connecting pattern is lower than a resistivity of the second sensing pads,
    wherein the line width of the first connecting pattern and that of the second connecting pattern are substantially larger than or equal to 1 μm and smaller than or equal to 30 μm.

2. The touch panel as claimed in claim 1, wherein the line width of the first connecting pattern and that of the second connecting pattern are substantially larger than or equal to 10 μm and smaller than or equal to 20 μm.

3. The touch panel as claimed in claim 1, wherein the first sensing string further comprises at least one first auxiliary pattern, connected between the plurality of first sensing pads, and the first connecting pattern is directly disposed on the first auxiliary pattern.

4. The touch panel as claimed in claim 3, wherein a line width of the first auxiliary pattern is smaller than or equal to the line width of the first connecting pattern within an area where the first connecting pattern is located.

5. The touch panel as claimed in claim 3, wherein a line width of the first auxiliary pattern in an area where the first connecting pattern is located is different from the line width of the first auxiliary pattern outside the area where the first connecting pattern is located.

6. The touch panel as claimed in claim 3, wherein a material of the first auxiliary pattern is the same as a material of the first sensing pads.

7. The touch panel as claimed in claim 1, wherein a material of the first connecting pattern comprises Ag, Al, Mo, Ti, Tn, Cu, Au, W, Cr or an alloy of the foregoing materials.

8. The touch panel as claimed in claim 1, wherein the second sensing string further comprises at least one second auxiliary pattern, connected between the second sensing pads, and the second connecting pattern is directly disposed on the second auxiliary pattern.

9. The touch panel as claimed in claim 8, wherein a line width of the second auxiliary pattern is smaller than or equal to a line width of the second connecting pattern within an area where the second connecting pattern is located.

10. The touch panel as claimed in claim 8, wherein a line width of the second auxiliary pattern in an area where the second connecting pattern is located is different from the line width of the second auxiliary pattern outside the area where the second connecting pattern is located.

11. The touch panel as claimed in claim 8, wherein a material of the second auxiliary pattern is the same as a material of the second sensing pads.

12. The touch panel as claimed in claim 1, wherein the material of the first and second sensing pads is a transparent conductive material.

13. The touch panel as claimed in claim 1, wherein a material of the second connecting pattern comprises Ag, Al, Mo, Ti, Tn, Cu, Au, W, Cr or an alloy of the foregoing materials.

* * * * *